(12) United States Patent
Hoagland

(10) Patent No.: US 8,112,519 B1
(45) Date of Patent: Feb. 7, 2012

(54) SYSTEMS AND METHODS FOR UPDATING DEFINED BAND RANGES WHILE MAINTAINING BACKWARD COMPATIBILITY

(75) Inventor: James Allen Hoagland, Redwood City, CA (US)

(73) Assignee: Symantec Corporation, Mountain View, CA (US)

(*) Notice: Subject to any disclaimer, the term of this patent is extended or adjusted under 35 U.S.C. 154(b) by 247 days.

(21) Appl. No.: 12/430,574

(22) Filed: Apr. 27, 2009

(51) Int. Cl.
*G06F 15/173* (2006.01)
(52) U.S. Cl. ......... 709/224; 709/202; 709/203; 709/221
(58) Field of Classification Search .................. 709/224, 709/202, 203, 221
See application file for complete search history.

(56) References Cited

U.S. PATENT DOCUMENTS

| | | | |
|---|---|---|---|
| 2009/0281974 A1* | 11/2009 | Saxena et al. | 706/14 |
| 2010/0030795 A1* | 2/2010 | Pattabhi et al. | 707/101 |
| 2010/0241641 A1* | 9/2010 | Byun et al. | 707/757 |

* cited by examiner

*Primary Examiner* — Larry Donaghue
*Assistant Examiner* — Nicholas Taylor
(74) *Attorney, Agent, or Firm* — Holland & Hart LLP

(57) ABSTRACT

A computer-implemented method for updating defined band ranges and maintaining backward compatibility of previously defined band ranges is described. A first band set that includes a first set of defined band ranges is received. A first map that includes the first set of defined band ranges is created. An intermediate integer is assigned to each defined band range in the first set. A second band set that includes a second set of defined band ranges is received. A second map that includes the second set of defined band ranges is created. The assignment of ranges to an intermediate integer is updated so as to support both the first set and the second set of defined band ranges.

13 Claims, 13 Drawing Sheets

| 632 | 634 |
|---|---|
| BrandNew | Less than one day old |
| DaysAgo | At least one day old and less than 7 days old |
| WeeksAgo | At least 7 days old and less than 30 days old |
| MonthsAgo | At least 30 days old and less than 365 days old |
| YearsAgo | At least 365 days old |

| 932 | | | | |
|---|---|---|---|---|
| BrandNew | DaysAgo | WeeksAgo | MonthsAgo | YearsAgo |
| 1-50 | 51-100 | 101-150 | 151-200 | 201-255 |
| 942 | | | | |

| | 1254 | 942 | 1042 | 1142 |
|---|---|---|---|---|
| 1252 | | | | |
| Less than one day old | 25 | BrandNew | BrandNew | New |
| At least one day old and less than 7 days old | 75 | DaysAgo | DaysAgo | New |
| At least 7 days old and less than 30 days old | 125 | WeeksAgo | WeeksAgo | New |
| At least 30 days old and less than 90 days old | 165 | MonthsAgo | MonthsAgo | New |
| At least 90 days old and less than 180 days old | 185 | MonthsAgo | QuartersAgo | New |
| At least 180 days old and less than 365 days old | 195 | YearsAgo | QuartersAgo | Old |
| At least 365 days old and less than 540 days old | 205 | YearsAgo | QuartersAgo | Old |
| At least 540 days old | 233 | YearsAgo | YearsAgo | Old |

SYSTEMS AND METHODS FOR UPDATING DEFINED BAND RANGES WHILE MAINTAINING BACKWARD COMPATIBILITY

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors.

Some computer systems may be data providers and other computer systems may be data requesters. The data providers may maintain information about data and provide this information to the data requesters. For example, a computer system may request information about a particular data file. A data provider may receive this request and supply the requested information. Bands of values may be used to provide the information to the data requester.

Information received from a data provider may be used to carry out malicious activities that may be harmful to the data provider or other computer systems. For this reason, a form of data hiding may be implemented when information is sent from a data provider to a data requester. Implementing data hiding prevents the data provider from revealing more data than needed to eavesdropping parties. Bands (i.e., segments of a range) have been used to hide data. Current methods of using bands to hide data, however, lack backward compatibility as additional data requesters begin to request data. In addition, current data providers do not update current data hiding information as these additional data requesters begin to request data. As such, benefits may be realized by providing improved systems and methods for updating defined band ranges while maintaining backward compatibility.

SUMMARY

A computer-implemented method for updating defined band ranges and maintaining backward compatibility of previously defined band ranges is described. A first band set that includes a first set of defined band ranges is received. A first map that includes the first set of defined band ranges is created. An intermediate integer is assigned to each defined band range in the first set. A second band set that includes a second set of defined band ranges is received. A second map that includes the second set of defined band ranges is created. The assignment of ranges to an intermediate integer is updated so as to support both the first set and the second set of defined band ranges.

In one embodiment, a first intermediate integer map may be created that includes the first set of defined band ranges. A range of intermediate integers may be assigned to each of the first set of defined band ranges. The first intermediate integer map may be transmitted to the first client.

In one example, a second intermediate integer map may be created that includes the second set of defined band ranges. A range of intermediate integers may be assigned to each of the second set of defined band ranges. The second intermediate integer map may be transmitted to the second client.

In one embodiment, assigning an intermediate integer to the second set of defined band ranges comprises maintaining backward compatibility with the intermediate integers assigned to the first set of defined band ranges. An intermediate integer may be transmitted to the first client and the second client. The first client may interpret the intermediate integer according to the first intermediate integer map, and the second client may interpret the intermediate integer according to the second intermediate integer map.

A computer system configured to update defined band ranges and maintain backward compatibility of previously defined band ranges is also described. The system may include a processor and memory in electronic communication with the processor. The processor may be configured to receive a first band set that includes a first set of defined band ranges, and create a first map that includes the first set of defined band ranges. The processor may also be configured to assign an intermediate integer to each of the defined band ranges in the first set, and receive a second band set that includes a second set of defined band ranges. The processor may be further configured to create a second map that includes the second set of defined band ranges, and update the assignment of ranges to an intermediate integer so as to support both the first set and the second set of defined band ranges.

A computer-program product for updating defined band ranges and maintaining backward compatibility of previously defined band ranges is also described. The computer-program product may include a computer-readable medium having instructions thereon. The instructions may include code programmed to receive a first band set that includes a first set of defined band ranges, and create a first map that includes the first set of defined band ranges. The instructions may include code programmed to assign an intermediate integer to each of the defined band ranges in the first set, and receive a second band set that includes a second set of defined band ranges. The instructions may include code programmed to create a second map that includes the second set of defined band ranges, and update the assignment of ranges to an intermediate integer so as to support both the first set and the second set of defined band ranges.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 illustrates one example of a first band set;

FIG. 9 illustrates one example of a first intermediate integer-to-band map;

FIG. 12 is a block diagram illustrating one example of an original value-to-intermediate integer map;

Figure 1:
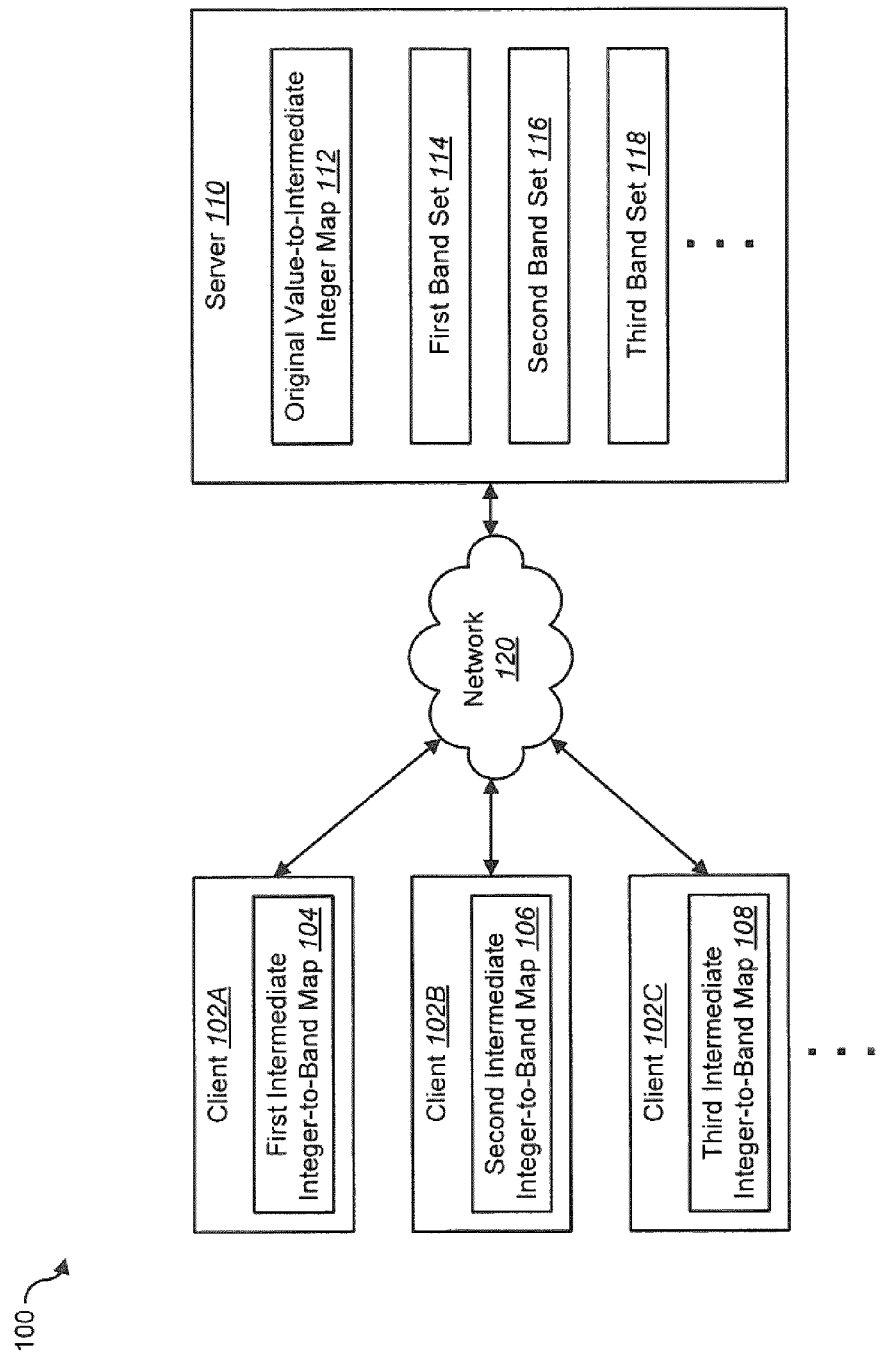
FIG. 1 is a block diagram illustrating one embodiment of a client-server environment in accordance with the present systems and methods.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In one embodiment, data providers may provide information to a client. In one example, a data provider may communicate data to the client about a data file. Certain reputation-related data fields may be used to transmit this information from the data provider. The client may use this information in the reputation-related data fields to determine the characteristics of the file. For example, the information may indicate whether the file is malware. In one configuration, the reputation-related data field may be a band (i.e., range of values).

In some embodiments, the data provider may desire to communicate reputation-related data to a client without revealing the exact value of the data (i.e., data hiding). A form of data hiding may be implemented so as to not reveal too much information to competitors or to those wishing to game the system about the data maintained by the data provider. Data hiding might also prevent revealing how certain algorithms of the data provider are implemented. In order to avoid revealing the exact value of the data, defined bands (i.e., ranges of values) may be provided. These bands may represent a continuous range of the original value of the data field.

Currently, data hiding schemes that use bands cannot guarantee that the set of defined bands will meet the needs of various clients. For example, future clients may desire different information that is not represented by the current set of defined band sets. As such, the present systems and methods allow the data provider the ability to update or segment band sets at a later date while maintaining backward compatibility for existing consumers.

FIG. 1 is a block diagram illustrating one embodiment of a client-server environment 100 in accordance with the present systems and methods. In one example, server 110 may communicate with one or more clients 102A, 102B, 102C over a network connection 120. The server 110 may be a back-end data provider. The clients 102A, 102B, 102C may be a personal computer, laptop, personal digital assistant (PDA), mobile computing device, mobile communications device, or any other sort of computing device. While only three clients 102A, 102B, 102C are illustrated, more or less than three clients may communicate with the server 110.

In one configuration, the server 110 may include a first band set 114, a second band set 116, and a third band set 118. Each of the band sets 114, 116, 118 may be associated with a particular client 102A, 102B, 102C, respectively. In another embodiment, multiple clients 102A, 102B, 102C may use any given band set 114, 116, 118. The band sets 114, 116, 118 may include different sets of defined bands. The definitions may be provided by the clients 102A, 102B, 102C. In one embodiment, the server 110 may provide information to the clients 102A, 102B, 102C in accordance with the definitions set forth in the band sets 114, 116, 118. Details regarding the band sets will be further described below.

The server 110 may also include an original value-to-intermediate integer map 112. In one example, an original value may represent the actual value associated with a particular piece of data. The original value may be mapped to an intermediate integer in order to implement a form of data hiding. The original value-to-intermediate integer map 112 may provide the correlation between the original value and an intermediate integer.

In one example, the server 110 may provide information about a certain piece of data to a client through the use of an intermediate integer. In other words, the intermediate integer may be transmitted to the client instead of the original value. Each client 102A, 102B, 102C may include an intermediate integer-to-band map 104, 106, 108, respectively. The intermediate integer-to-band maps 104, 106, 108 may indicate which definition included in a band set is represented by the received intermediate integer. Details regarding the intermediate integer-to-band maps 104, 106, 108 will also be described in more detail below.

Figure 2:
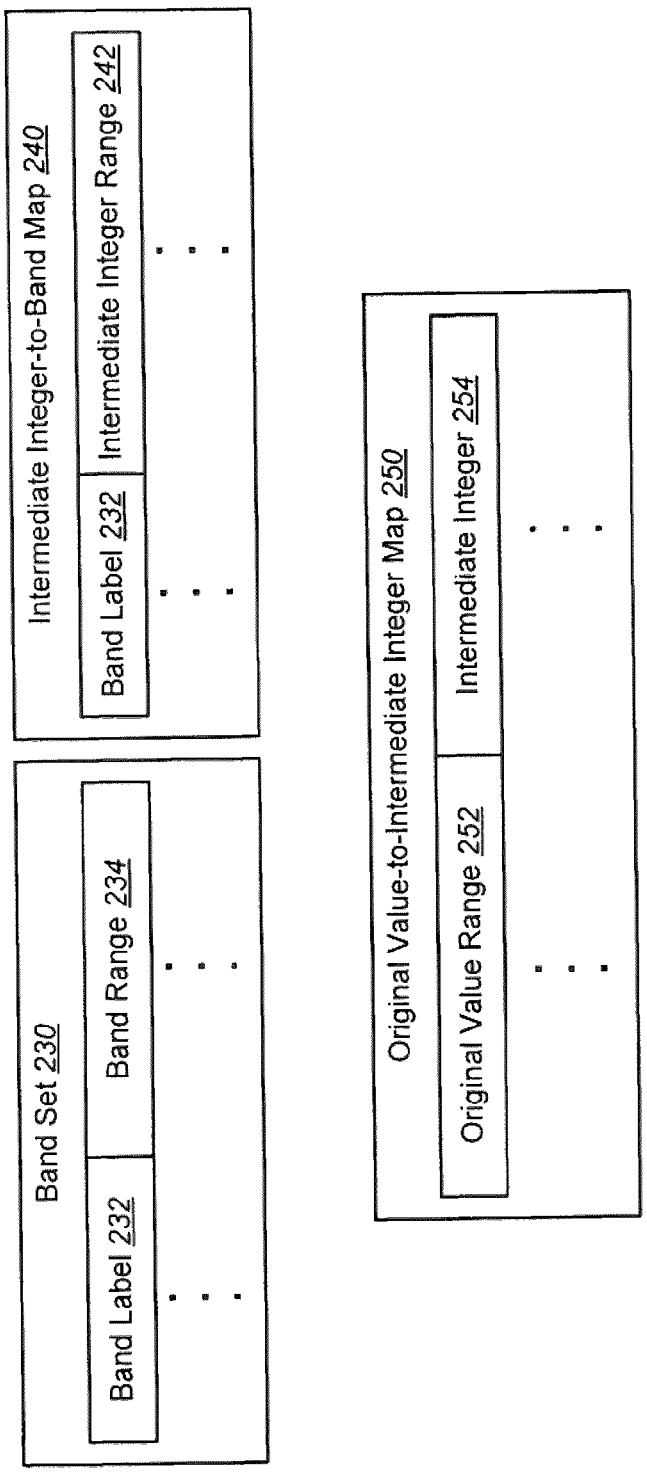
FIG. 2 is a block diagram illustrating one embodiment of a band set, a intermediate integer-to-band map, and an original value-to-intermediate integer map.

FIG. 2 is a block diagram illustrating one embodiment of a band set 230, a intermediate integer-to-band map 240, and an original value-to-intermediate integer map 250. In one configuration, the band set 230 may include a band label 232 and a band range 234. The range 234 may define a range of possible characteristics associated with a piece of data. The band label 232 may be a label (or name) assigned to each band range 234. The band set 230 may include one or more occurrences of a band label 232 and a band range 234. The server 110 may store a band set 230 for each client 102A, 102B, 102C.

In one embodiment, the intermediate integer-to-band map 240 may include the band label 232 and an intermediate integer range 242. The band label 232 may be similar to the band labels 232 included in the band set 230. In one configuration, the intermediate integer range 242 may be a predetermined range of numbers, letters, etc. In one example, each intermediate integer range 242 may be assigned a band label 232. The integer-to-band map 240 may include one or more occurrences of a band label 232 and an intermediate integer range 242. Each client 102A, 102B, 102C may include an intermediate integer-to-band map 240.

The original value-to-intermediate integer map 250 may include an original value (OV) range 252 and an intermediate integer 254. In one embodiment, a single OV range 252 may include the definition of a single band range 234. The original value-to-intermediate integer map 250 may include more than one occurrence of an OV range 252 and an intermediate integer 254.

The intermediate integer 254 may be a particular value associated with the OV range 252. The intermediate integer 254 may fall within the intermediate integer range 242. In one example, the original value-to-intermediate integer map 250 may be updated when a client provides a new band set 230. For example, a new client may provide a new band set 230 that includes band ranges 234 and band labels 232 that are different from previously received band sets 230. The original value range 252 may be updated to include these new band ranges 234. In addition, an intermediate integer 254 may be assigned to these new original value ranges 252.

Figure 3:
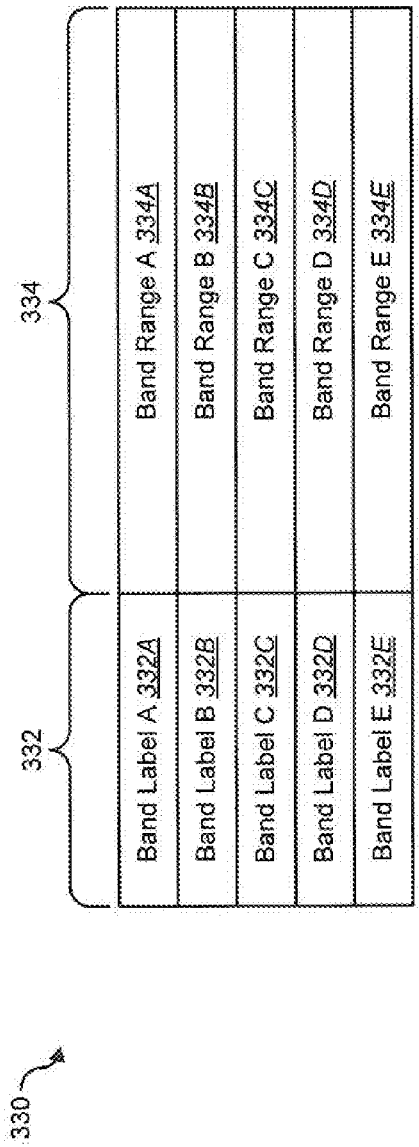
FIG. 3 is a block diagram illustrating another embodiment of a band set.

FIG. 3 is a block diagram illustrating one embodiment of a band set 330. As shown, the band set 330 may include a plurality of band labels 332 and a plurality of band ranges 334. Each client 102 may be associated with a particular band set 330. For example, a first client 102A may define five different band ranges in the band set 330, such as band range A 334A, band range B 334B, band range C 334C, band range D 334D, and band range E 334E. A band label 332 may be associated with each band range 334. Additional clients (such as clients 102B, 102C) may define more (or less) than the band ranges defined by the first client 102A.

Figure 4:
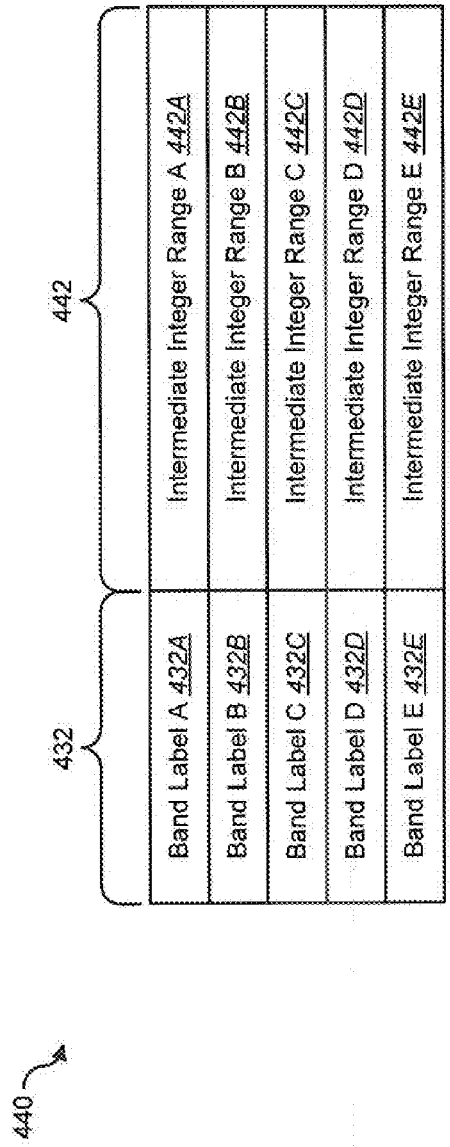
FIG. 4 is a block diagram illustrating another embodiment of an intermediate integer-to-band map.

FIG. 4 is a block diagram illustrating one embodiment of an intermediate integer-to-band map 440. The map 440 may be associated with a particular band set, such as the band set 330 described in FIG. 3. For example, the map 440 may include a plurality of intermediate integer ranges 442. Each of the ranges 442A, 442B, 442C, 442C, 442D, 442E may be associated with a corresponding band label 432A, 432B, 432C, 432D, 432E. The band labels 432 may correspond to the band labels 332 of the band set 330. In one embodiment, each client 102A, 102B, 102C may store a unique intermediate integer-to-band map 440.

Figure 5:
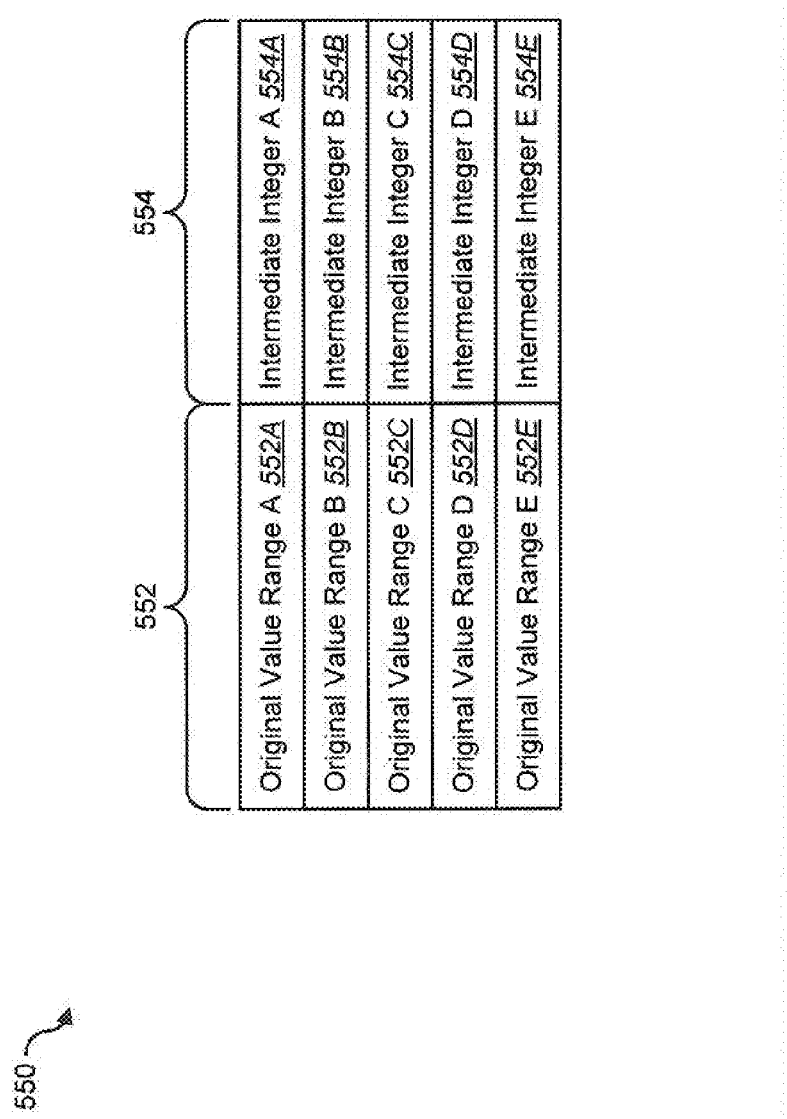
FIG. 5 is a block diagram illustrating another embodiment of an original value-to-intermediate integer map.

FIG. 5 is a block diagram illustrating one embodiment of an original value-to-intermediate integer map 550. The map 550 may include a plurality of original value ranges 552. Each range 552 may be assigned an intermediate integer 554. In one embodiment, each range 552 may include the definition of each band range 334 of a band set 330. Each intermediate integer 554 may be a particular value associated with each original value range 552. In one embodiment, each intermediate integer 554 may fall within one of the intermediate integer ranges 442 of the intermediate integer-to-band map 440. In one example, the original value-to-intermediate integer map 550 may be updated when a client provides a new band set. For example, a new client may provide a new band set that includes band ranges that are different from previously received band sets. The original value ranges 552 may be updated to include these new band ranges. In addition, new intermediate integers 554 may be assigned to these new original value ranges 552.

Figure 7:
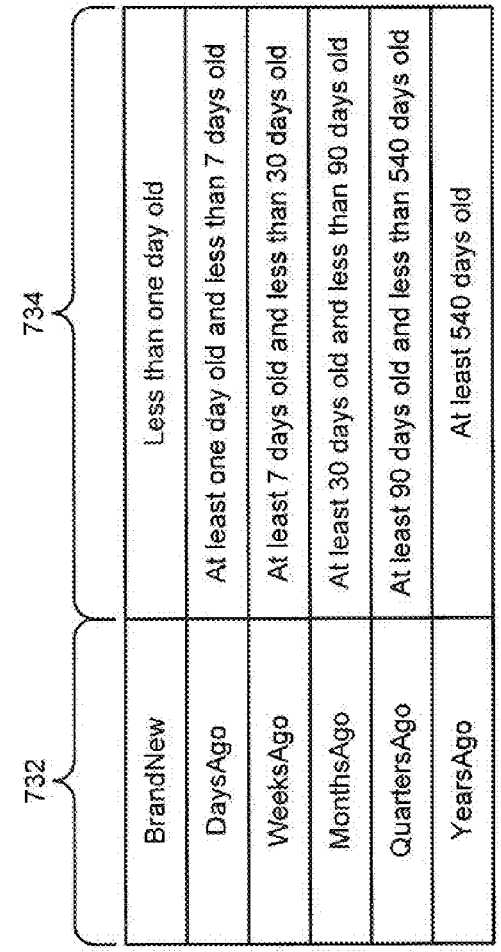
FIG. 7 illustrates one example of a second band set.
Figure 8:
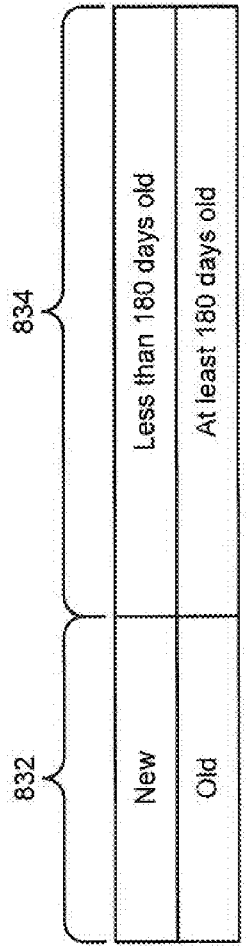
FIG. 8 illustrates one example of a third band set.

FIGS. 6-8 are block diagrams illustrating one possible embodiment of the first band set 114, the second band set 116, and the third band set 118, respectively. FIG. 6 illustrates one example of the first band set 114 illustrated in FIG. 1. The first band set 114 may be associated with a first client 102A. In one embodiment, the band set 114 may include a plurality of band labels 632 and a plurality of band ranges 634. In this particular example, the band set 114 may indicate how the first client 102A desires to define the age of a particular data file. For example, a file that satisfies the band range 634 "less than one day old" may be assigned the band label 632 "BrandNew." A data file that satisfies the band range 634 "at least one day old and less than 7 days old" may be assigned the band label 632 "DaysAgo." The first client 102A may provide the first band set 114 to the server 110, and the server 110 may store such band set 114.

FIG. 7 illustrates one example of the second band set 116 illustrated in FIG. 1. The second band set 116 may be associated with a second client 102B. In one embodiment, the band set 116 may include a plurality of band labels 732 and a plurality of band ranges 734. In this example, the second band set 116 may indicate how the second client 102B desires to define the age of a particular data file. For example, a file that satisfies the band range 734 "less than one day old" may be assigned the band label 732 "BrandNew." A data file that satisfies the band range 734 "at least one day old and less than 7 days old" may be assigned the band label 732 "DaysAgo." The second band set 116, however, differs from the first band set 114 described in FIG. 6. For example, the second band set 116 includes the band label 732 "QuartersAgo" which is defined by the band range 734 "at least 90 days old and less than 540 days old." In the example second band set 116, the band ranges 734 that define "MonthsAgo" and "YearsAgo" are also different from the band ranges 634 in the first band set 114.

FIG. 8 illustrates one example of the third band set 118 illustrated in FIG. 1. The third band set 118 may be associated with a third client 102C. In one embodiment, the band set 118 may include a plurality of band labels 832 and a plurality of band ranges 834. In this example, the third band set 118 may indicate how the third client 102C desires to define the age of a particular data file. For example, a file that satisfies the band range 834 "less than 180 days old" may be assigned the band label 832 "New." A data file that satisfies the band range 834 "at least 180 days old" may be assigned the band label 832 "Old." As illustrated, the third band set 118 differs from the first band set 114 and the second band set 116.

Figure 10:
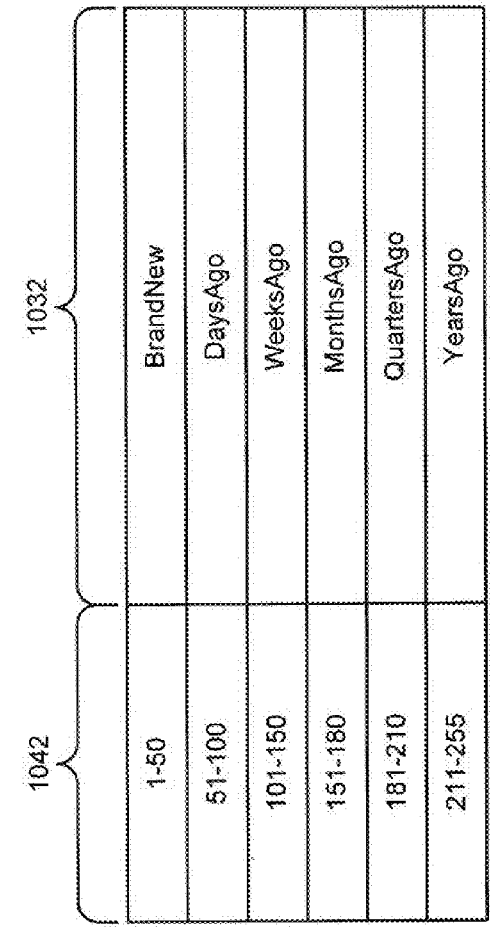
FIG. 10 illustrates one example of a second intermediate integer-to-band map.
Figure 11:
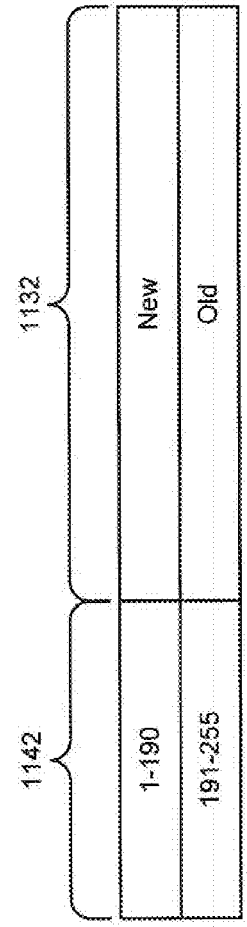
FIG. 11 illustrates one example of a third intermediate integer-to-band map.

FIGS. 9-11 are block diagrams illustrating possible examples of an intermediate integer-to-band map. For example, FIG. 9 illustrates one embodiment of a first map 104 that may be stored on the first client 102A. The first map 104 may include a plurality of intermediate integer ranges 942 and associated band labels 932. The band labels 932 of the map 104 may be similar to the band labels 632 provided in the first band set 114. In one example, the first client 102A may use the map 104 to determine the appropriate label to assign a data file based on the intermediate integer received from the server 110. For example, the first client 102A may query the server 110 about the age of a data file. The server 110 may return an intermediate integer with the value "80." The first client 102A may use the map 104 and determine that "80" falls with the range 942 corresponding to the band label 932 "DaysAgo." In one embodiment, the server 110 maintains data hiding by not revealing to the first client 102A the actual value associated with the age of the data file. Instead, the server 110 uses the first band set 114 to provide intermediate integer that is within a range 942 corresponding to the correct band label 932.

FIG. 10 illustrates one embodiment of a second intermediate integer-to-band map 106 that may be stored on the second client 102B. The second map 106 may include a plurality of intermediate integer ranges 1042 and associated band labels 1032. The band labels 1032 of the map 106 may be similar to the band labels 732 provided in the second band set 116. In one example, the second client 102B may use the map 106 to determine the appropriate label to assign a data file based on the intermediate integer received from the server 110. For example, the second client 102B may query the server 110 about the age of a data file. The server 110 may return an intermediate integer with the value "190." The second client 102B may use the map 106 and determine that "190" falls with the range 1042 corresponding to the band label 1032 "QuartersAgo." In one embodiment, the server 110 maintains a form of data hiding by not revealing to the second client 102B the actual value associated with the age of the data file. Instead, the server 110 uses the second band set 116 to provide an intermediate integer that is within a range 1042 corresponding to the correct band label 1032.

FIG. 11 illustrates one embodiment of a third intermediate integer-to-band map 108 that may be stored on the third client 102C. The third map 108 may include a plurality of intermediate integer ranges 1142 and associated band labels 1132. The band labels 1132 of the map 108 may be similar to the band labels 832 provided in the third band set 118. In one example, the third client 102C may use the map 108 to determine the appropriate label to assign a data file based on the intermediate integer received from the server 110. For example, the third client 102C may query the server 110 about the age of a data file. The server 110 may return an intermediate integer with the value "200." The third client 102C may use the map 108 to determine that "200" falls with the range 1142 corresponding to the band label 1132 "Old." In one embodiment, the server 110 maintains a form of data hiding by not revealing to the third client 102C the actual value associated with the age of the data file. Instead, the server 110 uses the third band set 118 to provide an intermediate integer that is within a range 1142 corresponding to the correct band label 1132.

FIG. 12 is a block diagram illustrating one embodiment of an original value-to-intermediate integer map 1250 in accordance with the examples provided in FIGS. 6-11. The map 1250 may include a plurality of original value ranges 1252. These ranges 1252 may include each band range 234 of the different band sets (for example the first band set 114, the second band set 116, and the third band set 118). The map 1250 may also include a plurality of intermediate integers 1254. In one embodiment, each range 1252 may be assigned one of the plurality 1254 of intermediate integer values. Also shown in FIG. 12 are the band labels 942, 1042, 1142 corresponding to each intermediate integer-to-band map 940, 1040, 1140. In other words, the band labels 942, 1042, 1142 indicate how each client 102A, 102B, 102C, respectively, may interpret a specific intermediate integer 1254.

In one example, the band range 1252 with the definition "less than one day old" may be assigned the intermediate integer "25." The first client 102A may use the first intermediate integer-to-band map 104 to assign the band label 942 "BrandNew." The second client 102B may use the second intermediate integer-to-band map 106 to assign the band label 1042 "BrandNew" if an intermediate integer of "25" is received. Similarly, the third client 102C may use the third intermediate integer-to-band map 108 to assign the band label 1142 "New" if an intermediate integer of "25" is received.

In another example, the band range 1252 with the definition "At least 365 days old and less than 540 days old" may be assigned the intermediate integer "205." The first client 102A may use the first intermediate integer-to-band map 104 to assign the band label 942 "YearsAgo." The second client 102B may use the second intermediate integer-to-band map 106 to assign the band label 1042 "QuartersAgo." Similarly, the third client 102C may use the third intermediate integer-to-band map 108 to assign the band label 1142 "Old" if an intermediate integer of "205" is received.

In one embodiment, the original value-to-intermediate integer map 1250 may be modified if a new band range is received. For example, a fourth client may provide a fourth band set to the server 110 that includes new band ranges that are not currently included on the original value-to-intermediate integer map 1250. The map 1250 may be modified to include these new ranges. In addition, the modifications to the map 1250 may be such that the intermediate integer-to-band maps 104, 106, 108 currently stored on the first, second, and third clients 102A, 102B, 102C are still true. In other words, the map 1250 may be modified such that the new band ranges do not prevent backward compatibility with already existing intermediate integer-to-band maps.

Figure 13:
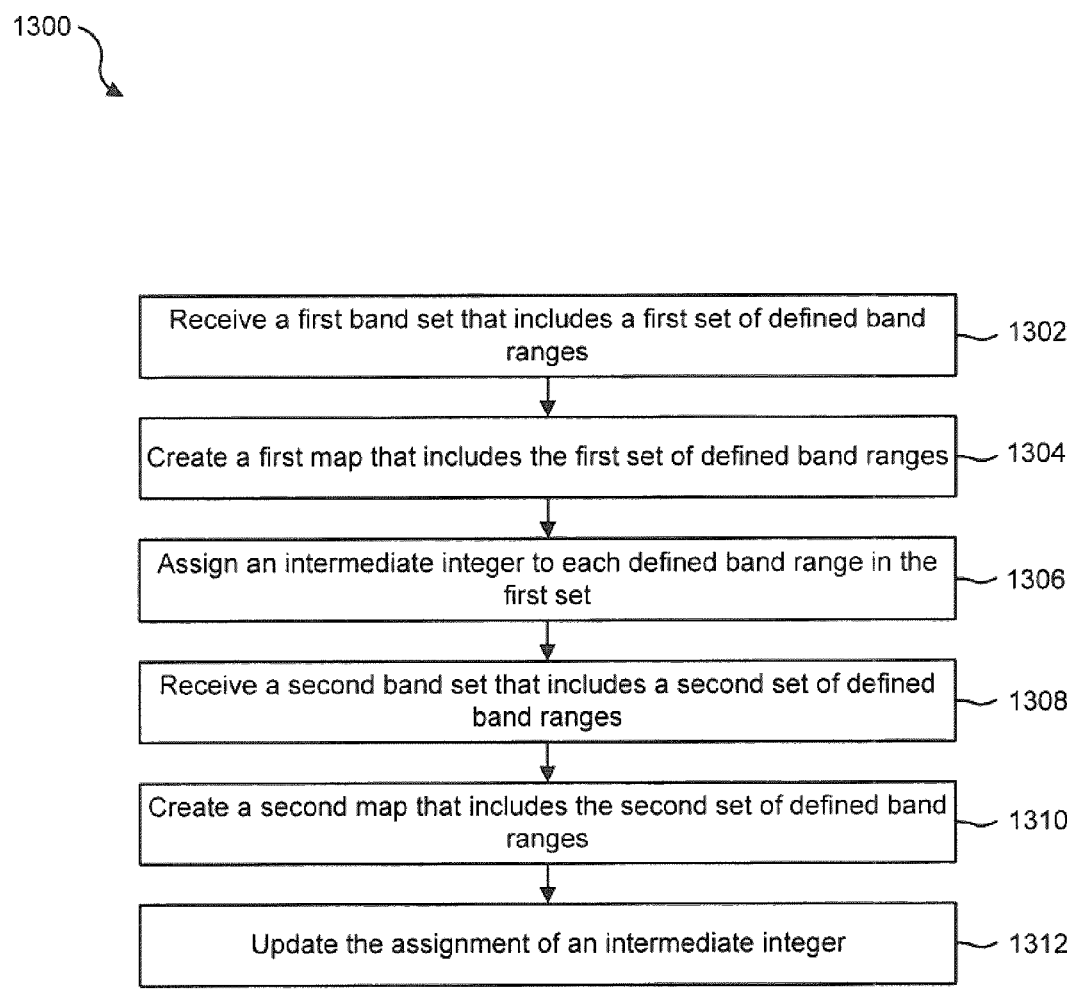
FIG. 13 is a flow diagram illustrating one embodiment of a method for updated defined band ranges while maintaining backward compatibility of previously defined band ranges.

FIG. 13 is a flow diagram illustrating one embodiment of a method 1300 for updating defined band ranges while maintaining backward compatibility of previously defined band ranges. The method 1300 may be implemented by the server 110. In one embodiment, a first band set that includes a first set of defined band ranges may be received 1302. A first map may be created 1304 that includes the first set of defined band ranges. In one configuration, an intermediate integer may be assigned 1306 to each defined band range included in the first set.

In one example, a second band set may be received 1308 that includes a second set of defined band ranges. A second map may be created 1310. In one embodiment, the second map updates the second set of defined band ranges. In addition, the assignment of an intermediate integer may be updated 1312. The assignment of the intermediate integer may be updated 1312 so that the first set and the second set of defined band ranges are both supported.

Figure 13A:
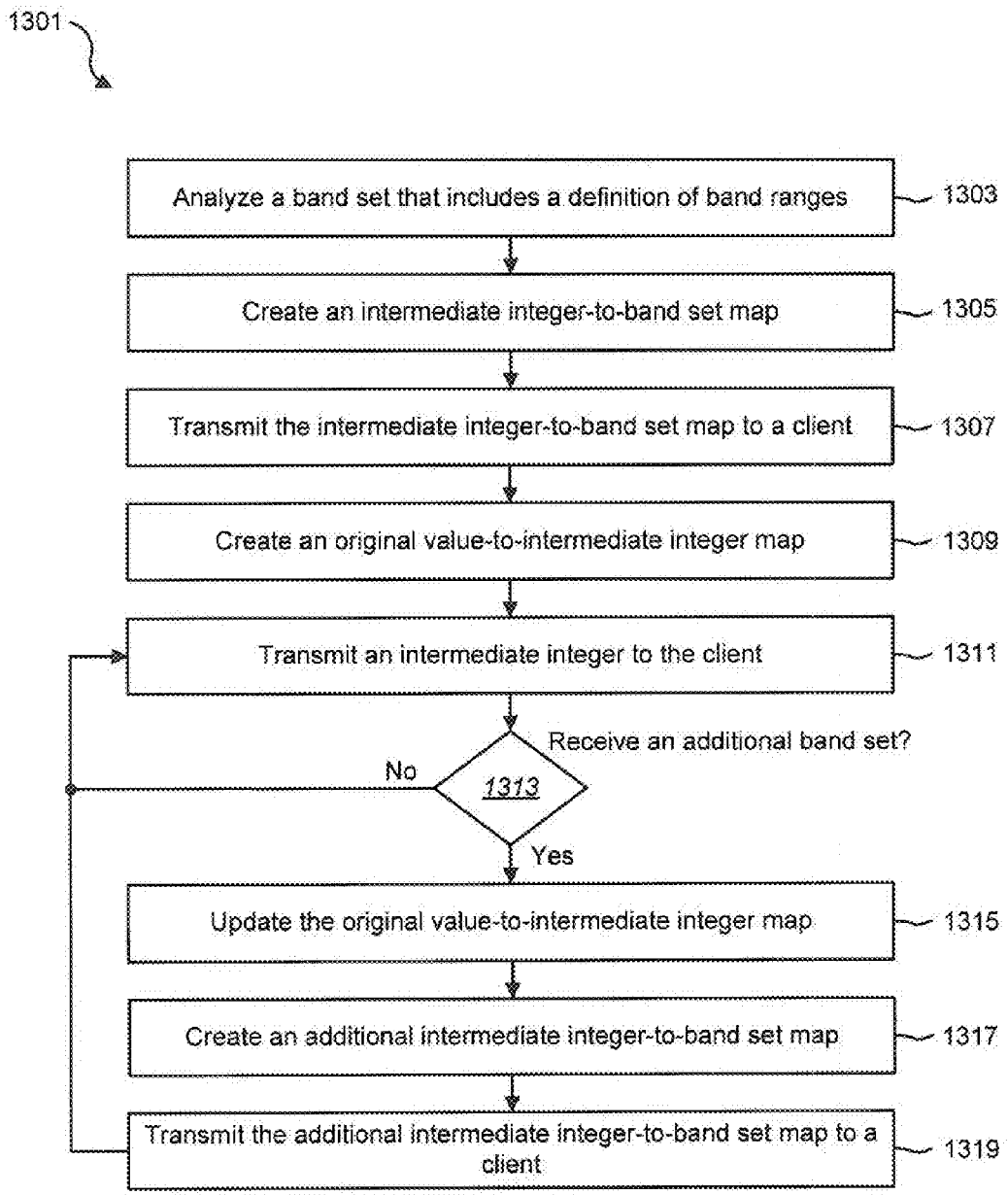
FIG. 13A is a flow diagram illustrating another embodiment of a method for updating defined band ranges while maintaining backward compatibility.

FIG. 13A is a flow diagram illustrating another embodiment of a method 1301 for updating defined band ranges while maintaining backward compatibility. In one configuration, the method 1301 may be implemented by the server 110. In one example, a band set that includes a definition of band ranges may be received and analyzed 1303. An intermediate integer-to-band set map may be created 1305 based on the analysis. In one example, the map may be transmitted 1307 to a client.

In one configuration, an original value-to-intermediate integer map may be created 1309. The map may include each definition of band ranges included in the band set. In addition, the map may include an intermediate integer assigned to each definition of band ranges. In one example, the intermediate integer may be transmitted 1311 to the client. A determination 1313 may be made as to whether an additional band set is received. If an additional band set is received, the original value-to-intermediate integer map may be updated 1315. For example, the map may be updated 1315 to include the defined band ranges that may be included in the additional band set. In addition, an additional intermediate integer-to-band set map may be created 1317. This additional map may be transmitted 1319 to a client that sent the additional band set. If it is determined 1313 that an additional band set is not received, the method 1301 may continue to transmit 1311 an intermediate integer to the client based on queries received from the client.

Figure 14:
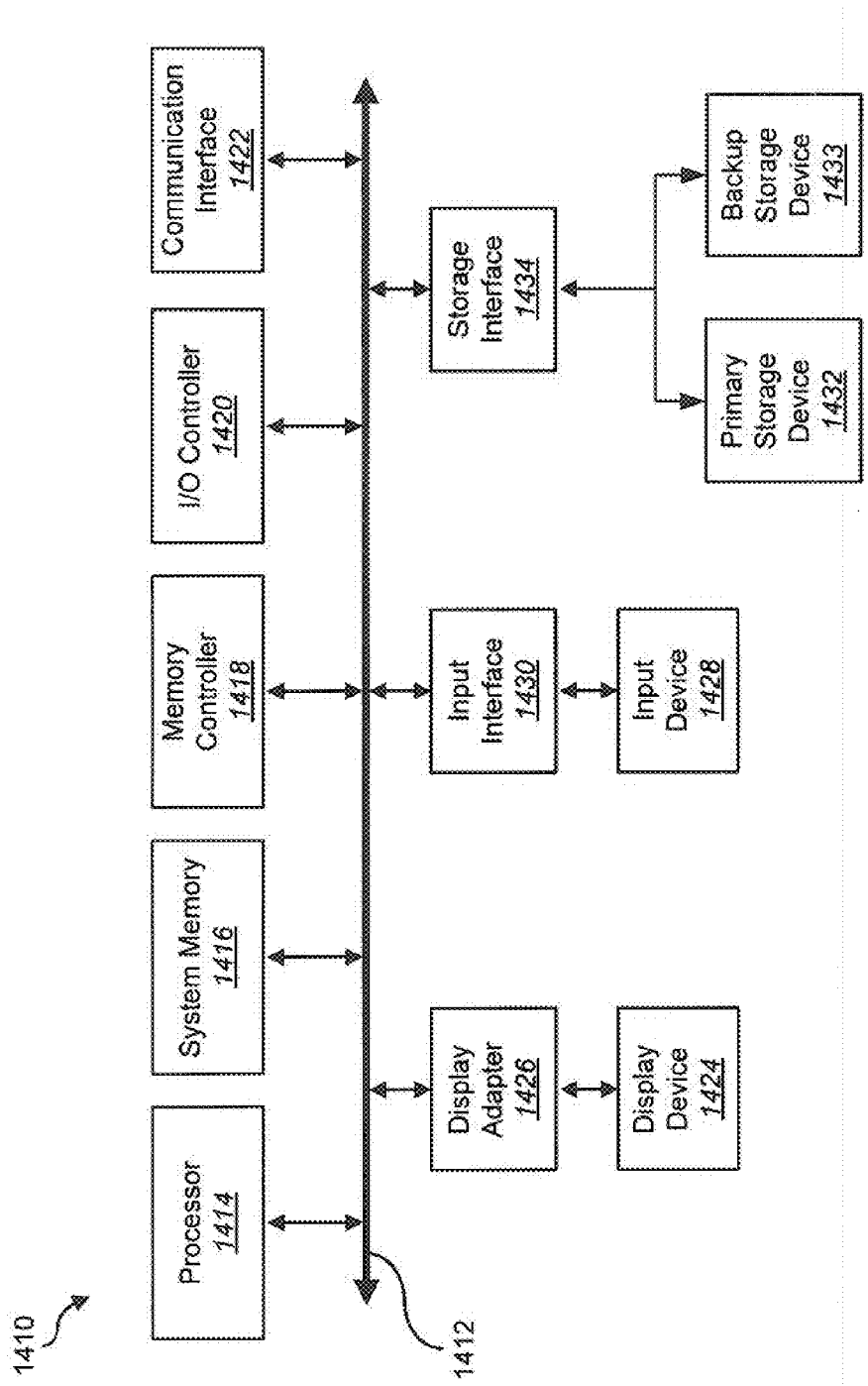
FIG. 14 is a block diagram of an exemplary computing system capable of implementing one or more of the embodiments described and/or illustrated herein.

FIG. 14 is a block diagram of an exemplary computing system 1410 capable of implementing one or more of the embodiments described and/or illustrated herein. Computing system 1410 broadly represents any single or multi-processor computing device or system capable of executing computer-readable instructions. Examples of computing system 1410 include, without limitation, workstations, laptops, client-side terminals, servers, distributed computing systems, handheld devices, or any other computing system or device. In its most basic configuration, computing system 710 may comprise at least one processor 1414 and system memory 1416.

Processor 1414 generally represents any type or form of processing unit capable of processing data or interpreting and executing instructions. In certain embodiments, processor 1414 may receive instructions from a software application or module. These instructions may cause processor 1414 to perform the functions of one or more of the exemplary embodiments described and/or illustrated herein. For example, processor 1414 may perform and/or be a means for performing, either alone or in combination with other elements, one or more of the receiving, creating, assigning, and updating steps described herein. Processor 1414 may also perform and/or be a means for performing any other steps, methods, or processes described and/or illustrated herein.

System memory 1416 generally represents any type or form of volatile or non-volatile storage device or medium capable of storing data and/or other computer-readable instructions. Examples of system memory 1416 include, without limitation, random access memory (RAM), read only memory (ROM), flash memory, or any other suitable memory device. Although not required, in certain embodiments computing system 1410 may comprise both a volatile memory unit (such as, for example, system memory 1416) and a non-volatile storage device (such as, for example, primary storage device 1432, as described in detail below).

In certain embodiments, exemplary computing system 1410 may also comprise one or more components or elements in addition to processor 1414 and system memory 1416. For example, as illustrated in FIG. 14, computing system 1410 may comprise a memory controller 1418, an Input/Output (I/O) controller 1420, and a communication interface 1422, each of which may be interconnected via a communication infrastructure 1412. Communication infrastructure 1412 generally represents any type or form of infrastructure capable of facilitating communication between one or more components of a computing device. Examples of communication infrastructure 1412 include, without limitation, a communication bus (such as an ISA, PCI, PCIe, or similar bus) and a network.

Memory controller 1418 generally represents any type or form of device capable of handling memory or data or controlling communication between one or more components of computing system 1410. For example, in certain embodiments memory controller 1418 may control communication between processor 1414, system memory 1416, and I/O controller 1420 via communication infrastructure 1412. In certain embodiments, memory controller 1418 may perform and/or be a means for performing, either alone or in combination with other elements, one or more of the steps or features described and/or illustrated herein, such as receiving, creating, assigning, and updating.

I/O controller 1420 generally represents any type or form of module capable of coordinating and/or controlling the input and output functions of a computing device. For example, in certain embodiments I/O controller 1420 may control or facilitate transfer of data between one or more elements of computing system 1410, such as processor 1414, system memory 1416, communication interface 1422, display adapter 1426, input interface 1430, and storage interface 1434. I/O controller 1420 may be used, for example, to perform and/or be a means for receiving, creating, assigning, and updating steps described herein. I/O controller 1420 may also be used to perform and/or be a means for performing other steps and features set forth in the instant disclosure.

Communication interface 1422 broadly represents any type or form of communication device or adapter capable of facilitating communication between exemplary computing system 1410 and one or more additional devices. For example, in certain embodiments communication interface 1422 may facilitate communication between computing system 1410 and a private or public network comprising additional computing systems. Examples of communication interface 1422 include, without limitation, a wired network interface (such as a network interface card), a wireless network interface (such as a wireless network interface card), a modem, and any other suitable interface. In at least one embodiment, communication interface 1422 may provide a direct connection to a remote server via a direct link to a network, such as the Internet. Communication interface 1422 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 1422 may also represent a host adapter configured to facilitate communication between computing system 1410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1422 may also allow computing system 1410 to engage in distributed or remote computing. For example, communication interface 1422 may receive instructions from a remote device or send instructions to a remote device for execution. In certain embodiments, communication interface 1422 may perform and/or be a means for performing, either alone or in combination with other elements, one or more of the receiving, creating, assigning, and updating steps disclosed herein. Communication interface 1422 may also be used to perform and/or be a means for performing other steps and features set forth in the instant disclosure.

As illustrated in FIG. 14, computing system 1410 may also comprise at least one display device 1424 coupled to communication infrastructure 1412 via a display adapter 1426. Display device 1424 generally represents any type or form of device capable of visually displaying information forwarded by display adapter 1426. Similarly, display adapter 1426 generally represents any type or form of device configured to forward graphics, text, and other data from communication infrastructure 1412 (or from a frame buffer, as known in the art) for display on display device 1424.

As illustrated in FIG. 14, exemplary computing system 1410 may also comprise at least one input device 1428 coupled to communication infrastructure 1412 via an input interface 1430. Input device 1428 generally represents any type or form of input device capable of providing input, either computer or human generated, to exemplary computing system 1410. Examples of input device 1428 include, without limitation, a keyboard, a pointing device, a speech recognition device, or any other input device. In at least one embodiment, input device 1428 may perform and/or be a means for performing, either alone or in combination with other elements, one or more of the receiving, creating, assigning, and updating steps disclosed herein. Input device 1428 may also be used to perform and/or be a means for performing other steps and features set forth in the instant disclosure.

As illustrated in FIG. 14, exemplary computing system 1410 may also comprise a primary storage device 1432 and a backup storage device 1433 coupled to communication infrastructure 1412 via a storage interface 1434. Storage devices 1432 and 1433 generally represent any type or form of storage device or medium capable of storing data and/or other computer-readable instructions. For example, storage devices 1432 and 1433 may be a magnetic disk drive (e.g., a so-called hard drive), a floppy disk drive, a magnetic tape drive, an optical disk drive, a flash drive, or the like. Storage interface 1434 generally represents any type or form of interface or device for transferring data between storage devices 1432 and 1433 and other components of computing system 1410.

In certain embodiments, storage devices 1432 and 1433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1432 and 1433 may also comprise other similar structures or devices for allowing computer software, data, or other computer-readable instructions to be loaded into computing system 1410. For example, storage devices 1432 and 1433 may be configured to read and write software, data, or other computer-readable information. Storage devices 1432 and 1433 may also be a part of computing system 1410 or may be a separate device accessed through other interface systems.

Storage devices 1432 and 1433 may also be used, for example, to perform and/or be a means for performing, either alone or in combination with other elements, one or more of the receiving, creating, assigning, and updating steps disclosed herein. Storage devices 1432 and 1433 may also be used to perform and/or be a means for performing other steps and features set forth in the instant disclosure.

Many other devices or subsystems may be connected to computing system 1410. Conversely, all of the components and devices illustrated in FIG. 14 need not be present to practice the embodiments described and/or illustrated herein. The devices and subsystems referenced above may also be interconnected in different ways from that shown in FIG. 14. Computing system 1410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1410. All or a portion of the computer program stored on the computer-readable medium may then be stored in system memory 1416 and/or various portions of storage devices 1432 and 1433. When executed by processor 1414, a computer program loaded into computing system 1410 may cause processor 1414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1410 may be configured as an application specific integrated circuit (ASIC) adapted to implement one or more of the exemplary embodiments disclosed herein.

Figure 15:
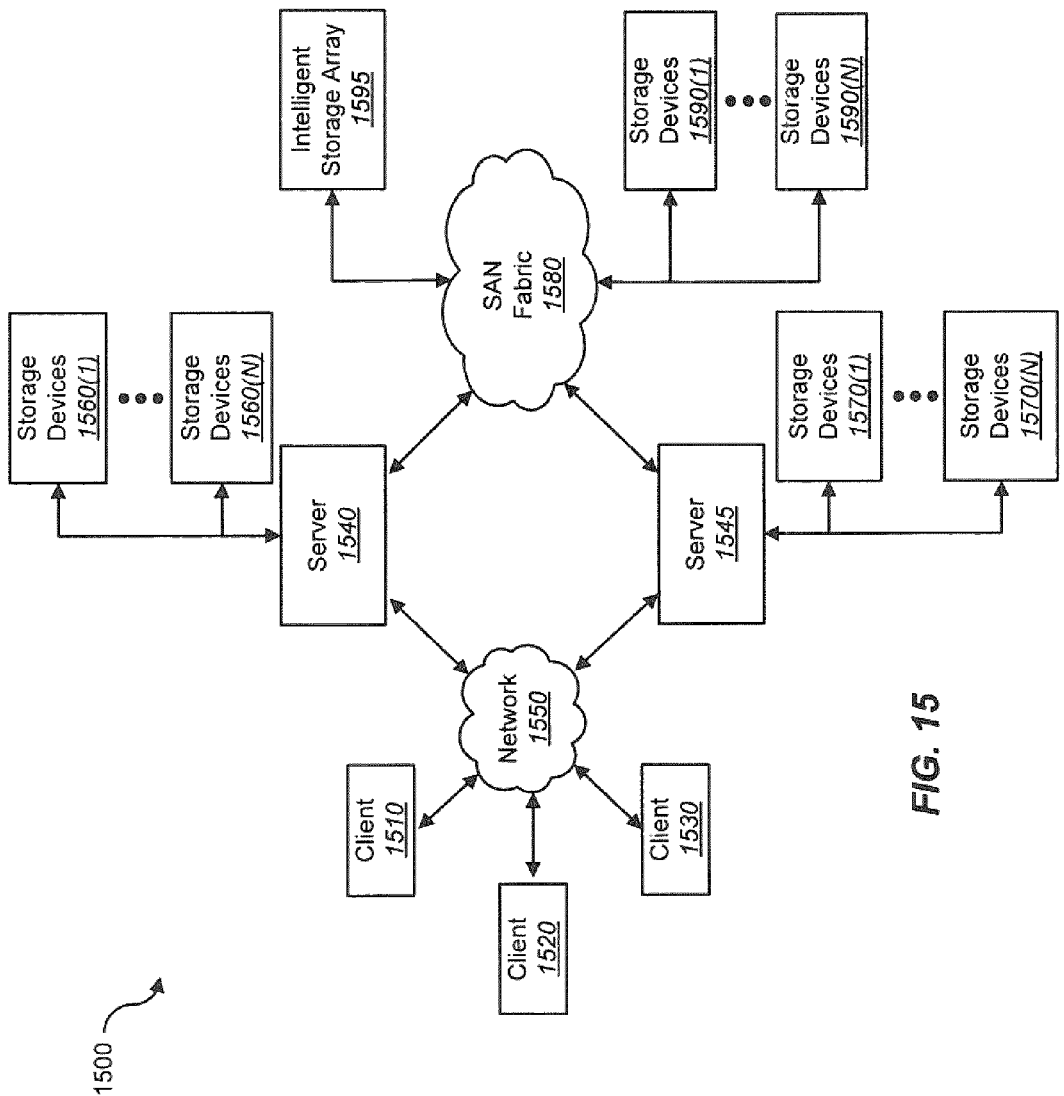
FIG. 15 is a block diagram of an exemplary network architecture in which client systems and servers may be coupled to a network.

FIG. 15 is a block diagram of an exemplary network architecture 1500 in which client systems 1510, 1520, and 1530 and servers 1540 and 1545 may be coupled to a network 1550. Client systems 1510, 1520, and 1530 generally represent any type or form of computing device or system, such as exemplary computing system 1410 in FIG. 14. Similarly, servers 1540 and 1545 generally represent computing devices or systems, such as application servers or database servers, configured to provide various database services and/or to run certain software applications. Network 1550 generally represents any telecommunication or computer network; including, for example, an intranet, a wide area network (WAN), a local area network (LAN), a personal area network (PAN), or the Internet.

As illustrated in FIG. 15, one or more storage devices 1560(1)-(N) may be directly attached to server 1540. Similarly, one or more storage devices 1570(1)-(N) may be directly attached to server 1545. Storage devices 1560(1)-(N) and storage devices 1570(1)-(N) generally represent any type or form of storage device or medium capable of storing data and/or other computer-readable instructions. In certain embodiments, storage devices 1560(1)-(N) and storage devices 1570(1)-(N) may represent network-attached storage (NAS) devices configured to communicate with servers 1540 and 1545 using various protocols, such as NFS, SMB, or CIFS.

Servers 1540 and 1545 may also be connected to a storage area network (SAN) fabric 1580. SAN fabric 1580 generally represents any type or form of computer network or architecture capable of facilitating communication between a plurality of storage devices. SAN fabric 1580 may facilitate communication between servers 1540 and 1545 and a plurality of storage devices 1590(1)-(N) and/or an intelligent storage array 1595. SAN fabric 1580 may also facilitate, via network 1550 and servers 1540 and 1545, communication between client systems 1510, 1520, and 1530 and storage devices 1590(1)-(N) and/or intelligent storage array 1595 in such a manner that devices 1590(1)-(N) and array 1595 appear as locally attached devices to client systems 1510, 1520, and 1530. As with storage devices 1560(1)-(N) and storage devices 1570(1)-(N), storage devices 1590(1)-(N) and intelligent storage array 1595 generally represent any type or form of storage device or medium capable of storing data and/or other computer-readable instructions.

In certain embodiments, and with reference to exemplary computing system 1410 of FIG. 14, a communication interface, such as communication interface 1422 in FIG. 14, may be used to provide connectivity between each client system 1510, 1520, and 1530 and network 1550. Client systems 1510, 1520, and 1530 may be able to access information on server 1540 or 1545 using, for example, a web browser or other client software. Such software may allow client systems 1510, 1520, and 1530 to access data hosted by server 1540, server 1545, storage devices 1560(1)-(N), storage devices 1570(1)-(N), storage devices 1590(1)-(N), or intelligent storage array 1595. Although FIG. 15 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1540, server 1545, storage devices 1560(1)-(N), storage devices 1570(1)-(N), storage devices 1590(1)-(N), intelligent storage array 1595, or any combination thereof. All or a portion of one or more of the exemplary embodiments disclosed herein may also be encoded as a computer program, stored in server 1540, run by server 1545, and distributed to client systems 1510, 1520, and 1530 over network 1550. Accordingly, network architecture 1500 may perform and/or be a means for performing, either alone or in combination with other elements, one or more of the receiving, creating, assigning, and updating steps disclosed herein. Network architecture 1500 may also be used to perform and/or be a means for performing other steps and features set forth in the instant disclosure.

As detailed above, computing system 1410 and/or one or more of the components of network architecture 1500 may perform and/or be a means for performing, either alone or in combination with other elements, one or more steps of the exemplary methods described and/or illustrated herein. For example, computing system 1410 and/or one or more of the components of network architecture 1500 may perform and/or be a means for performing a computer-implemented method for updating defined band ranges and maintaining backward compatibility of previously defined band ranges that may comprise: 1) receiving a first band set that includes a first set of defined band ranges, 2) creating a first map that includes the first set of defined band ranges, 3) assigning an intermediate integer to each defined band range in the first set, 4) receiving a second band set that includes a second set of defined band ranges, 5) creating a second map that includes the second set of defined band ranges, and then 6) updating the assignment of an intermediate integer to support both the first set and the second set of defined band ranges.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for updating defined band ranges and maintaining backward compatibility of previously defined band ranges, comprising:
   receiving a first request message from a first client to create a first intermediate integer-to-band map, the first request message comprising a first band set that includes a first set of defined band ranges;
   creating the first intermediate integer-to-band map that assigns a range of intermediate integers to each defined band range in the first set of defined band ranges;
   transmitting the first intermediate integer-to-band map to the first client;
   creating an original value-to-intermediate integer map that assigns an intermediate integer to a defined band range in the first set of defined band ranges;
   receiving a second request message from a second client to create a second intermediate integer-to-band map, the second request message comprising a second band set that includes a second set of defined band ranges;
   creating the second intermediate integer-to-band map that assigns a range of intermediate integers to each defined band range in the second set of defined band ranges;
   transmitting the second intermediate integer-to-band map to the second client;
   updating the assignment of each intermediate integer in the original value-to-intermediate integer map to assign each intermediate integer to each defined band range in both the first set and the second set of defined band ranges;
   receiving a request for information relating to data associated with the first and second band sets, wherein the request is sent from the first or second client;
   calculating an intermediate integer to represent the information relating to the data; and
   transmitting the calculated intermediate integer to at least the client that sent the request.

2. The method of claim 1, first intermediate integer-to-band map assigns a band label to each defined band range in the first set of defined band ranges.

3. The method of claim 1, wherein the second intermediate integer-to-band map assigns a band label to each defined band range in the second set of defined band ranges.

4. The method of claim 1, wherein assigning an intermediate integer to each of the defined band ranges in the second set of defined band ranges comprises maintaining backward compatibility with the intermediate integers assigned to each of the defined band ranges in the first set of defined band ranges.

5. The method of claim 1, further comprising transmitting an intermediate integer to the first client and the second client.

6. The method of claim 5, wherein the first client interprets the intermediate integer according to the first intermediate integer-to-band map and the second client interprets the intermediate integer according to the second intermediate integer-to-band map.

7. A computer system configured to update defined band ranges and maintain backward compatibility of previously defined band ranges, comprising:
- a processor;
- memory in electronic communication with the processor;
- the processor configured to:
    - receive a first request message from a first client to create a first intermediate integer-to-band map, the first request message comprising a first band set that includes a first set of defined band ranges;
    - create the first intermediate integer-to-band map that assigns a range of intermediate integers to each defined band range in the first set of defined band ranges;
    - transmit the first intermediate integer-to-band map to the first client;
    - create an original value-to-intermediate integer map that assigns an intermediate integer to a defined band range in the first set of defined band ranges;
    - receive a second request message from a second client to create a second intermediate integer-to-band map, the second request message comprising a second band set that includes a second set of defined band ranges;
    - create the second intermediate integer-to-band map that assigns a range of intermediate integers to each defined band range in the second set of defined band ranges;
    - transmit the second intermediate integer-to-band map to the second client;
    - update the assignment of each intermediate integer in the original value-to-intermediate integer map to assign each intermediate integer to each defined band range in both the first set and the second set of defined band ranges; and
    - receive a request for information relating to data associated with the first and second band sets, wherein the request is sent from the first or second client;
    - calculate an intermediate integer to represent the information relating to the data and
        - transmit the calculated intermediate integer to at least the client that sent the request.

8. The computer system of claim 7, wherein first intermediate integer-to-band map assigns a band label to each defined band range in the first set of defined band ranges.

9. The computer system of claim 7, wherein the second intermediate integer-to-band map assigns a band label to each defined band range in the second set of defined band ranges.

10. The computer system of claim 7, wherein assigning an intermediate integer to each of the defined band ranges in the second set of defined band ranges comprises maintaining backward compatibility with the intermediate integers assigned to each of the defined band ranges in the first set of defined band ranges.

11. The computer system of claim 7, wherein the processor is further configured to transmit an intermediate integer to the first client and the second client.

12. The computer system of claim 11, wherein the first client interprets the intermediate integer according to the first intermediate integer-to-band map and the second client interprets the intermediate integer according to the second intermediate integer-to-band map.

13. A computer-program product for updating defined band ranges and maintaining backward compatibility of previously defined band ranges, the computer-program product comprising a non-transitory computer-readable medium having instructions thereon, the instructions comprising:
- code programmed to receive a first request message from a first client to create a first intermediate integer-to-band map, the first request message comprising a first band set that includes a first set of defined band ranges;
- code programmed to create the first intermediate integer-to-band map that assigns a range of intermediate integers to each defined band range in the first set of defined band ranges;
- code programmed to transmit the first intermediate integer-to-band map to the first client;
- code programmed to create an original value-to-intermediate integer map that assigns an intermediate integer to a defined band range in the first set of defined band ranges;
- code programmed to receive a second request message from a second client to create a second intermediate integer-to-band map, the second request message comprising a second band set that includes a second set of defined band ranges;
- code programmed to create the second intermediate integer-to-band map that assigns a range of intermediate integers to each defined band range in the second set of defined band ranges;
- code programmed to transmit the second intermediate integer-to-band map to the second client;
- code programmed to update the assignment of each intermediate integer in the original value-to-intermediate integer map to assign each intermediate integer to each defined band range in both the first set and the second set of defined band ranges;
- code programmed to receive a request for information relating to data associated with the first and second band sets, wherein the request is sent from the first or second client;
- code programmed to calculate an intermediate integer to represent the information relating to the data; and
- code programmed to transmit the calculated intermediate integer to at least the client that sent the request.

* * * * *